Jan. 12, 1954    L. T. COOKSON    2,666,109
LIQUID LEVEL CONTROL
Filed Oct. 25, 1950
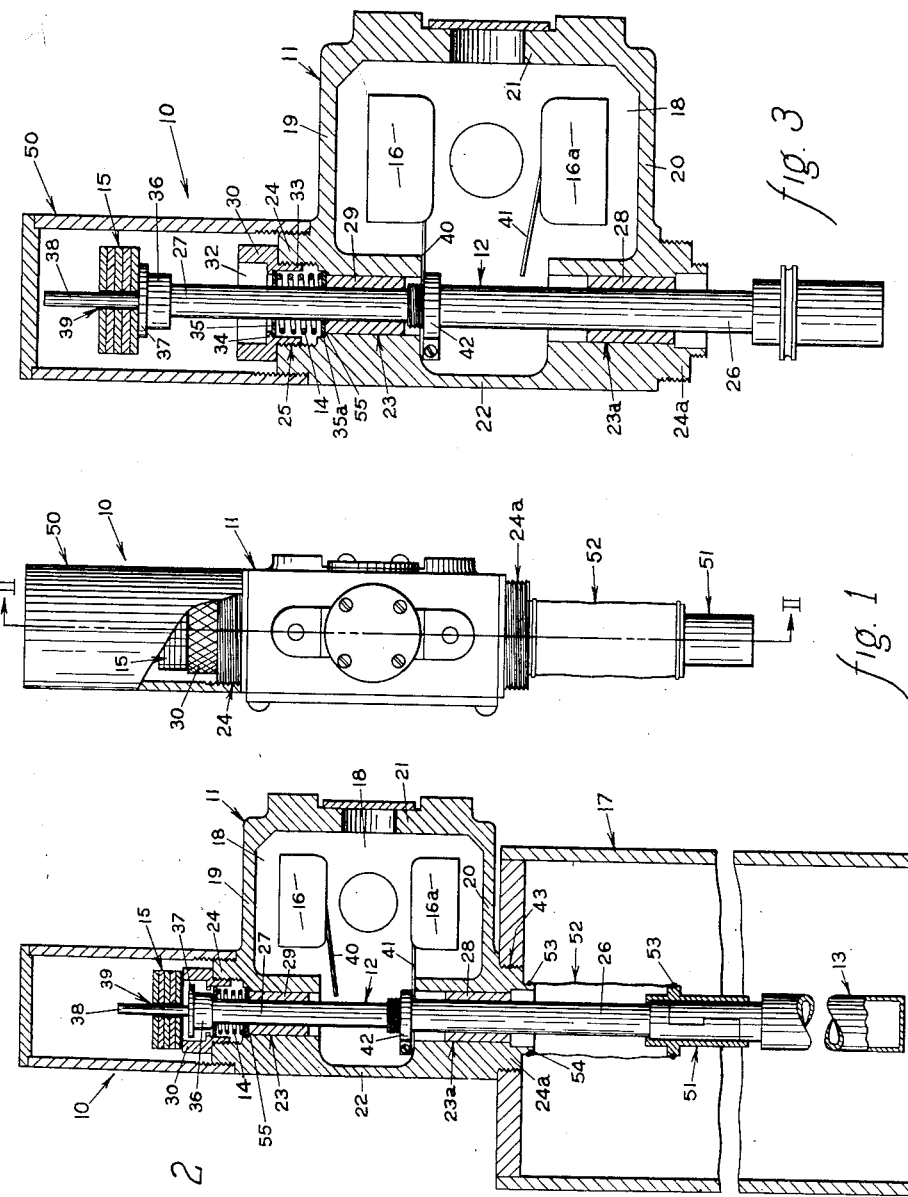
LEONARD T. COOKSON
Inventor
Attorney Patented Jan. 12, 1954

2,666,109

UNITED STATES PATENT OFFICE 2,666,109

LIQUID LEVEL CONTROL

Leonard T. Cookson, Kalamazoo, Mich., assignor to The Upjohn Company, Kalamazoo, Mich., a corporation of Michigan Application October 25, 1950, Serial No. 192,118

13 Claims. (Cl. 200—84)

This invention relates to a device for controlling the level of a liquid in a tank, and more specifically to a type thereof having a float utilized to actuate a pair of electrical switches spaced a short distance apart.

As is well known in the industry, it is often necessary to keep the quantity of liquid in a tank above a certain minimum amount. In order to accomplish this, a device is often provided which will automatically actuate pumping means to fill the tank when the liquid level in the tank falls to a certain predetermined minimum level, and which will cut off such pumping means when the liquid level in the tank rises to a certain predetermined maximum level.

Many such liquid level control devices have been constructed where a float, responsive to the liquid level, is utilized to control said pumping means. However, these level control devices present a problem in that the float moves a distance equal to the fall or rise in the liquid level. Thus, where large tanks are employed, it has been necessary to use a construction wherein the float can move over a large distance, which requires a large and bulky unit and/or complicated linkage. Further, each such device had to be constructed to fit a particular tank.

Accordingly, a principal object of this invention is to provide a device for controlling the liquid level in a tank between a predetermined maximum and a predetermined minimum level.

A further object of this invention is to provide a device, as aforesaid, utilizing a float responsive to the liquid level in a tank, wherein the distance traveled by said float is relatively small in comparison to the change in liquid level in the tank.

A further object of this invention is to provide a liquid level control, as aforesaid, wherein means are provided both to yieldably resist downward movement of the float beyond a predetermined position and also to yieldably resist movement of the float beyond a predetermined position.

A further object of this invention is to provide a liquid level control, as aforesaid, wherein electrical switching means are responsive to the upward and downward movement of the float above and below certain predetermined positions.

A further object of this invention is to provide a liquid level control, as aforesaid, that may be constructed in a compact unit and which may be used with a variety of tanks of different sizes.

Further objects and purposes of this invention will become apparent to persons familiar with this type of device by reading the following description and examining the accompanying drawings.

In the drawings:

Figure 1 is a broken side elevation view of my invention.

Figure 2 is a sectional view of the invention, taken along the line II—II of Figure 1, showing the float in the lowermost position, that is, the position assumed when the liquid level in the tank has fallen below a predetermined minimum level, and including a tank.

Figure 3 is an enlarged sectional view substantially as taken along the line II—II of Figure 1, showing the apparatus in the uppermost position, that is, the position assumed when the liquid level in the tank has risen above a predetermined maximum level.

General description

In meeting the above outlined objects, as well as others incidental thereto, I have provided a liquid level control 10 (Figures 1, 2 and 3), having a central housing 11 with a rod 12 substantially supported therein for vertical movement, said rod 12 having a vertically elongated float 13 secured at the lower end. A spring 14 is secured within said housing around said rod for yieldably resisting downward movement of said rod 12 below a certain predetermined position and weights 15 are positioned in the upward path of travel of said rod 12 so as to yieldably resist upward movement of said rod beyond a certain predetermined position. A pair of microswitches 16 and 16a, which stop and start pumping means (not shown) for filling the vessel or tank 17, are secured within said central housing 11 and are actuated by upward and downward movement of the rod 12.

For the purpose of convenience and without intending any limitations, the terms "inwardly" and "outwardly," as used herein, shall have reference to the geometric center of the control 10 and parts thereof. The terms "upper," "lower," "rightward" and "leftward" shall be used in referring to the parts of the invention as they appear in Figures 2 and 3.

Detailed description

The central housing 11 of the liquid level control 10 (Figures 2 and 3) which is made of any suitable material, such as cast steel or cast aluminum, is in this particular embodiment rectangular in cross section and has an upper wall 19, a lower wall 20 and side walls 21 and 22. A central chamber 18, which is disposed within the central housing 11, extends substantially across the width of said housing 11, and is of reduced cross section in the leftward portion thereof adjacent the side wall 22.

A pair of co-axial, upper and lower ports 23 and 23a are provided, respectively, in the upper and lower walls 19 and 20 adjacent to the side wall 22, the axes thereof being parallel to the side wall 22. Said ports 23 and 23a extend through the respective walls 19 and 20 and communicate with the central chamber 18 in the reduced portion thereof.

An upper annular boss 24 (Figures 2 and 3), which is externally and internally threaded, is integral with and extends upwardly from the upper wall 19, and is co-axial with said upper port 23. The inside diameter of said upper annular boss 24 is somewhat greater than the inside diameter of the port 23, thereby providing an internal, upwardly facing shoulder 55, therebetween.

A lower annular boss 24a, which is integral with and extends downwardly from the lower wall 20, is externally threaded and co-axial with the port 23a. Said boss 24a has a central opening therethrough co-axial with, and communicating with, the port 23a, but of somewhat larger diameter. An annular projection 54, is integral with, extends downwardly from and is co-axial with said boss 24a.

A rod 12, having a lower portion 26 and an upper portion 27 of reduced diameter, is vertically slidably disposed within the ports 23 and 23a. Bushings 28 and 29 may be provided within the ports 23a and 23, respectively, for slidably engaging the lower and upper portions of the rod 12, in a conventional manner.

The upper portion 27 of the rod 12 is preferably of such length that, when the lower end thereof is substantially flush with the upper end of the lower port 23a, the upper end of the portion 27 extends above the upper annular boss 24. Similarly, the lower portion 26 of the rod 12 is of such length that, when its upper end is substantially flush with the lower end of the upper port 23, the lowermost end of the portion 26 extends below the lower annular boss 24a.

A cylindrical support collar 30 (Figures 2 and 3), having a co-axial opening 32 extending therethrough, is provided with a portion 33 of reduced external diameter which is externally threaded for engagement with the threaded opening 25 in the upper boss 24. The inside diameter of the opening 32 is substantially larger than the external diameter of the rod upper portion 27. A radially inwardly extending, annular ridge 34 is provided in the wall of the opening 32 at the junction thereof with the reduced portion 33.

A resilent spring member 14 is positioned around the upper portion 27 of the rod 12 and held under compression between the ridge 34 and the shoulder 55. A pair of flat rings 35 and 35a are disposed between the upper and lower ends of said spring and the ridge 34 and shoulder 55, respectively. The inside diameter of the ring 35 is substantially less than the inside diameter of the annular ridge 34.

A cylindrical collar 36, having a radially outwardly extending flange 37 integral therewith adjacent to the upper end thereof, is secured to the upper end of the rod 12 by conventional means. The collar 36, which is co-axial with the rod 12, is of slightly less diameter than the inside diameter of the annular ridge 34 so that it may pass therethrough and engage the upper ring 35.

The flange 37 is of less diameter than the opening 32, but greater than the inside diameter of the ridge 34, whereby engagement between the flange 37 and ridge 34 will positively limit downward movement of the collar 36, hence the rod 12.

A pin 38, which is co-axial with and of smaller diameter than the rod 12, is secured to the upper end thereof. A plurality of disk-shaped weights 15, each disk having a central opening 39 for reception of pin 38 and being of greater outside diameter than the opening 32 but less than the outside diameter of upper boss 24, are supportable upon the collar 30.

A cylindrical cap member 50, which is threadedly engaged with the external threads of the upper annular boss 24, completely encloses the support collar 30, the pin 38 and the weights 15. The cap member 50 is of sufficient height to allow for upward movement of the pin 38.

A float 13, which is preferably a vertically disposed, elongated, hollow cylinder, is secured at its upper end to the lower end of the rod 12 by a conventional joint 51. Said float may be made from other convenient bouyant material. A splash-tight seal is provided between the joint 51 and the boss 24a by means such as a flexible bellows 52, which is secured between and upon the joint 51 and the annular projection 54 on the boss 24a by means of the grommets 53.

A pair of micro-switches 16 and 16a are secured to an inside wall of the chamber 18 of the housing 11 by conventional means. The micro-switch 16 is disposed in the upper portion of the chamber 18 and has a substantially horizontal contact arm 40 which extends toward and is spaced slightly from the rod 12 adjacent to the port 23. The micro-switch 16a, which is disposed in the lower portion of the chamber 18, beneath the micro-switch 16, has a similar contact arm 41 which extends toward and is spaced from the rod 12 adjacent to the lower port 23a.

A suitable actuating ring 42, which is secured to the rod 12 at the junction of the upper and lower portions thereof, extends from said rod 12 a distance sufficient to overlap said contact arms whereby actuation of the switches 16 and 16a is effected when the rod 12 is moved upwardly or downwardly, respectively.

*Operation*

In operation, the level control 10 of this invention (Figures 1, 2 and 3) may be secured to the upper end of a tank 17 by threaded engagement between the boss 24a and an opening 43 in the top of the tank.

When the level of the liquid in tank 17 has dropped so that the float 13 is either partially immersed or not immersed at all, the weights of the rod 12 and the float 13 compresses the spring 14 and the ring 42 depresses the arm 41 (Figure 2), thereby closing the switch 16a. This closing of switch 16a actuates said pumping means (not shown) whereby the tank 17 is refilled. When the collar 36 engages the ring 35, the weights 15 are supported upon the collar 30.

By employing a spring 14 having a preselected resistance to compression, the bouyancy of the float and its effect upon movement of the rod 12 can be accurately predetermined.

As the liquid level rises in the tank 17, the float 13 is increasingly immersed and an upward force is exerted upon the rod 12. When the liquid level in the tank 17 reaches such a height that the combined bouyant force of the liquid acting on the float and the upward force of the compressed spring 14 balances the weight of the rod 12 and the float 13, the rod is then free to ascend with the rise in the liquid level. When such balance occurs, the float 15 will be substantially less than totally immersed in the liquid. When the upper ring 35 is urged against the ridge 34 by the spring 14, continued upward movement of the rod 12 must be effected entirely by the bouyant force of the liquid acting on the float 13. Thus, since the flange 37 on the collar 36 will next engage the weights 15, the upward movement of the rod 12 will be impeded until said bouyant force of the liquid overcomes the force of gravity upon the weights 15, the rod 12 and the parts supported thereon. When this force of gravity is overcome by said bouyant force, the rod will again rise with the liquid level until the actuating ring 42 engages the contact arm 40 and closes the micro-switch 16, which shuts off said pumping means.

It can be readily seen that by selecting a spring having a particular resistance to compression by carefully selecting a float having predetermined bouyancy characteristics, and by regulating the number or load of weights 15, the amount of rise in the liquid level in the tank 17 during the full stroke of the rod 12 can be accurately controlled. Further, although the stroke of the rod 12 is very small, the distance between maximum and minimum levels in the tank with which the level control 10 is used may be relatively large.

Although the above description and drawings apply to one particular, preferred embodiment of the invention, it is not my intention, implied or otherwise to eliminate other variations or modifications which do not depart from the scope of the invention unless specifically stated to the contrary in the hereinafter appended claims.

I claim:

1. In apparatus for controlling the level of a liquid in a vessel, the combination comprising: a float responsive to the level of a liquid in said vessel; means yieldably to resist the downward movement of the float beyond a predetermined point; means yieldably to resist upward movement of the float beyond substantially the same predetermined point; electrical switching means responsive to upward movement of the float a selected distance above a predetermined point to terminate the flow of liquid into said vessel; and electrical switching means responsive to downward movement of the float a selected distance below said predetermined point to initiate flow of liquid into the vessel.

2. In apparatus for controlling the liquid level in a vessel, the combination comprising: a rod; means slidably holding said rod in a vertical position; means on the lower end of said rod for fixing same to a float; a pair of electrical switches spaced apart vertically and means positioning said switches adjacent to said rod; means yieldably resisting downward movement of said rod from a predetermined position when said actuating means is substantially intermediate said switches; normally inoperative means becoming operative at substantially said predetermined position upon upward movement of said float, said last-named means yieldably resisting further upward movement of said float beyond said position; means on said rod actuating said one of said switches on upward movement of said rod a selected distance above said predetermined position and actuating the other of said switches on downward movement of said rod a selected distance below said predetermined position; and means supporting said rod holding means fixedly upon said vessel.

3. In apparatus for controlling the liquid level in a vessel, the combination comprising: a housing; a rod slidably secured in a vertical position within said housing; means on the lower end of said rod for fixing same to a float; a pair of electrical switches spaced apart vertically and means positioning said switches adjacent to said rod; means on said rod actuating one of said switches on upward movement of said rod and the other of said switches on the downward movement of said rod; a collar adjacent to the upper end of said rod; an annular shoulder formed in said housing adjacent to said rod and spaced from said collar when said rod is in a position intermediate the extremities of its stroke; a coil spring encircling said rod and positioned between said shoulder and said collar; a plurality of weights and means detachably supporting same on the upper end of said rod; and separate means mounted on said housing for independently supporting said weights whenever said rod is below a predetermined position above said intermediate position.

4. In apparatus for controlling the level of a liquid in a vessel, the combination comprising: a float responsive to the level of a liquid in said vessel; means yieldably to resist the downward movement of the float beyond a first predetermined point; a weight and means independently supporting said weight when said float is below a second predetermined point, said first predetermined point being spaced below said second predetermined point; means movable with said float for engaging and lifting said weight as said float moves above said second predetermined point; electrical switching means responsive to upward movement of the float a selected distance above said second predetermined point to terminate the flow of liquid into said vessel; and electrical switching means responsive to downward movement of the float a selected distance below said first predetermined point to initiate flow of liquid into the vessel.

5. In apparatus for controlling the liquid level in a vessel, the combination comprising: a housing; a rod slidably secured in a vertical position within said housing; means on the lower end of said rod for fixing same to a float; a pair of electrical switches spaced apart vertically and means positioning said switches adjacent to said rod; means on said rod actuating one of said switches on upward movement of said rod and actuating the other of said switches on the downward movement of said rod; a collar adjacent to the upper end of said rod; an annular shoulder formed in said housing adjacent to said rod and spaced from said collar when said rod is in a position intermediate the extremities of its stroke; a coil spring encircling said rod and positioned between said shoulder and said collar; a plurality of weights and means detachably supporting same on the upper end of said rod.

6. In apparatus for controlling the liquid level in a vessel, the combination comprising: a housing; a rod slidably secured in a vertical position within said housing; means on the lower end of said rod for fixing same to a float; a pair of electrical switches spaced apart vertically and means positioning said switches adjacent to said rod; means on said rod actuating one of said switches on upward movement of said rod and the other of said switches on the downward movement of said rod; a collar adjacent to the upper end of said rod; means for retaining the end of a coil spring, said means being associated with said housing adjacent to said rod and spaced from said collar when said rod is in a position intermediate the extremity of its stroke; a coil spring encircling said rod and positioned between said last named means and said collar and engaged by said last named means; means detachably supporting a plurality of weights on the upper end of said rod.

7. In apparatus for controlling the liquid level in a vessel, the combination comprising: a housing; a rod slidably secured in a vertical position within said housing; means on the lower end of said rod for fixing same to a float; a pair of electrical switches spaced apart vertically and means positioning said switches adjacent to said rod; means on said rod actuating one of said switches on upward movement of said rod and the other of said switches on the downward movement of said rod; means yieldably resisting downward movement of said rod from a point intermediate its switch actuating positions; a plurality of weights and means detachably supporting same on the upper end of said rod; and separate means mounted on said housing for independently supporting said weights whenever said rod is below a predetermined position above said intermediate point.

8. In apparatus for controlling the liquid level in a vessel the combination comprising: a housing; a rod slidably secured in a vertical position within said housing; means defining one compartment within said housing; a pair of spaced electrical switches within said compartment and actuating means on said switches extending toward said rod; engaging means on said rod engaging one of said actuating means on upward movement of said rod and engaging the other of said actuating means on downward movement of said rod; means associated with said housing defining another compartment surrounding said rod; resilient means within said compartment and adjacent said rod and means on said rod for engaging said resilient means on downward movement of said rod, said engagement taking place at a point in said movement prior to the engagement of said last named actuating means by said engaging means; means supporting a weight adjacent said rod and means on said rod for engaging said weight and lifting it off said weight supporting means upon upward movement of said rod, said rod engaging and lifting said weight off said weight supporting means prior to the portion of its upward movement at which said engaging means engages said first named actuating means.

9. The combination defined in claim 8 wherein means are provided in said weight defining an opening therethrough and the end of said rod includes a pilot extending slidably through said opening.

10. The combination defined in claim 3 wherein said parts are so spaced with respect to each other that said rod has a short distance of free travel before engaging either said coiled spring on a downward stroke or engaging said weights on an upward stroke.

11. In apparatus for controlling the liquid level in a vessel, the combination comprising: a housing; a rod slidably secured in a vertical position within said housing and having a collar near its upper end; means on the lower end of said rod for fixing same to a float; a pair of electrical switches spaced apart vertically; means on said rod actuating one of said switches on upward movement of said rod and the other of said switches on the downward movement of said rod; a shoulder in said housing adjacent said rod and spaced from said collar when said rod is in a position intermediate the extremities of its stroke; a coil spring encircling said rod and positioned between said shoulder and said collar; a plurality of weights and means detachably supporting same on the upper end of said rod; and separate means for independently supporting said weights whenever said rod is below a predetermined position above said intermediate position.

12. In apparatus for controlling the liquid level in a vessel, the combination comprising: a housing; a rod slidably secured in a vertical position within said housing; means on said rod for fixing same to a float; a pair of electrical switches spaced apart vertically; means on said rod actuating one of said switches on upward movement of said rod and actuating the other of said switches on the downward movement of said rod; a collar adjacent to the upper end of said rod; an annular shoulder formed in said housing adjacent to said rod and spaced downwardly from said collar when said rod is in a position intermediate the extremities of its stroke; a coil spring encircling said rod and positioned between said shoulder and said collar; a plurality of weights and means detachably supporting same on the upper end of said rod.

13. In apparatus for controlling the level of a liquid in a vessel, the combination comprising: a float responsive to the level of a liquid in said vessel; means yieldably to resist the downward movement of the float beyond a predetermined point; normally inoperative means becoming operative upon upward movement of said float to substantially the same predetermined point for yieldably resisting further upward movement of said float beyond said point; electrical switching means responsive to upward movement of the float at a selected distance above said predetermined point to terminate the flow of liquid into said vessel; and electrical switching means responsive to downward movement of the float a selected distance below said predetermined point to initiate flow of liquid into the vessel.

LEONARD T. COOKSON.

References Cited in the file of this patent

UNITED STATES PATENTS

| Number | Name | Date |
|---|---|---|
| 1,182,539 | Eatman | May 9, 1916 |
| 1,759,503 | Gerlach et al. | May 20, 1930 |
| 1,827,084 | Henning | Oct. 13, 1931 |
| 1,942,698 | Henning | Jan. 9, 1934 |
| 2,103,941 | Franey | Dec. 28, 1937 |
| 2,259,265 | Pearce | Oct. 14, 1941 |

FOREIGN PATENTS

| Number | Country | Date |
|---|---|---|
| 502,345 | Germany | July 10, 1930 |